W. H. MUZZY.
CASH REGISTER.
APPLICATION FILED AUG. 11, 1908.

994,774.

Patented June 13, 1911.

3 SHEETS—SHEET 1.

Witnesses

Inventor

W. H. MUZZY.
CASH REGISTER.
APPLICATION FILED AUG. 11, 1908.

994,774.

Patented June 13, 1911.
3 SHEETS—SHEET 2.

Witnesses

Inventor

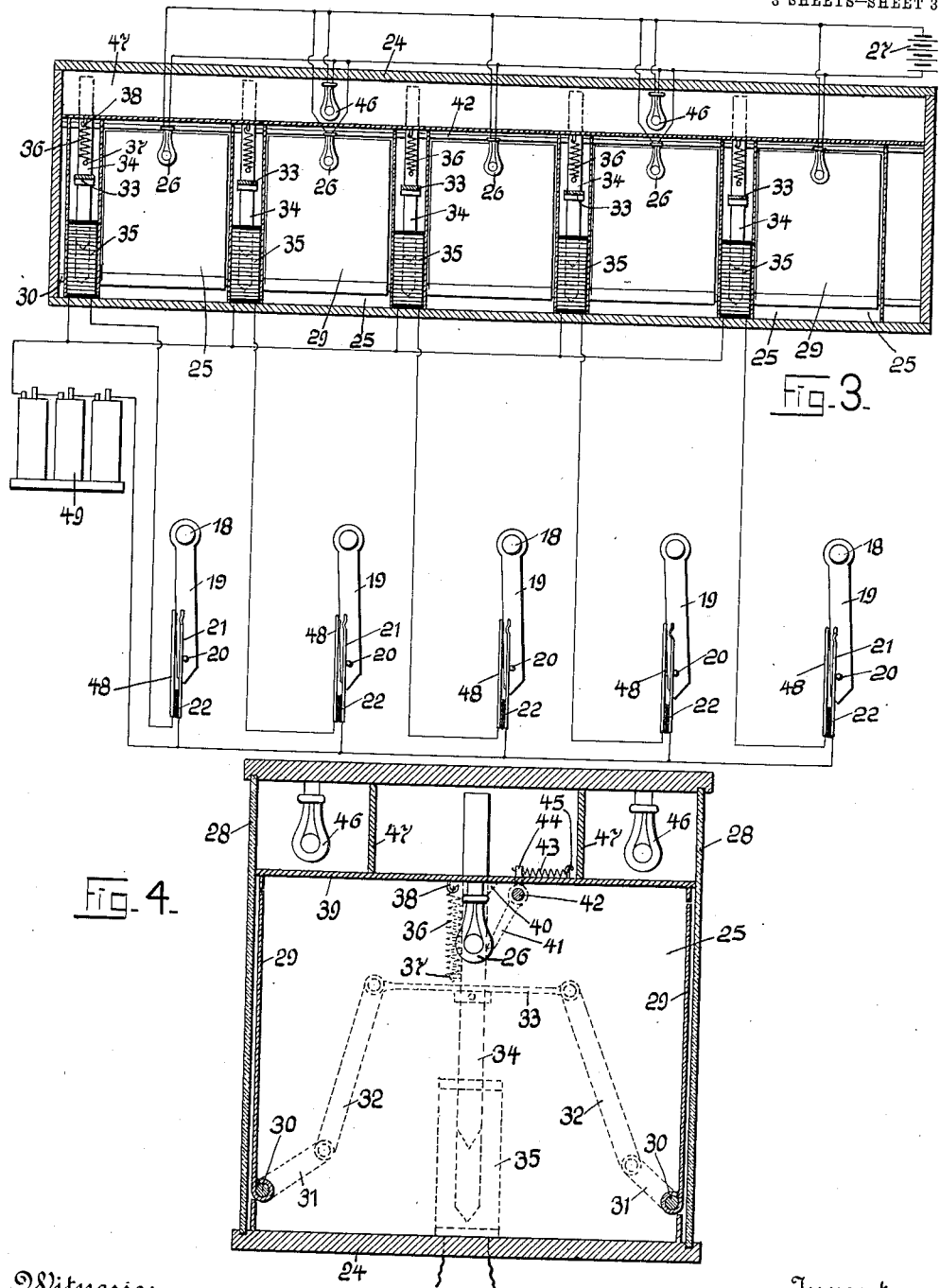

UNITED STATES PATENT OFFICE.

WILLIAM H. MUZZY, OF NEW YORK, N. Y., ASSIGNOR TO THE NATIONAL CASH REGISTER COMPANY, OF DAYTON, OHIO, A CORPORATION OF OHIO, (INCORPORATED IN 1906.)

CASH-REGISTER.

994,774.

Specification of Letters Patent. Patented June 13, 1911.

Application filed August 11, 1908. Serial No. 448,033.

*To all whom it may concern:*

Be it known that I, WILLIAM H. MUZZY, a citizen of the United States, residing at New York, in the county of New York and State of New York, have invented certain new and useful Improvements in Cash-Registers, of which I declare the following to be a full, clear, and exact description.

This invention relates to improvements in cash registers, and has more particular relation to improvements in indicating devices therefor.

The principal object of the invention is to provide an improved cash register indication, for use particularly in cafés, restaurants, etc., whereby approximately the amount registered will be apparent at a distance from the cash register proper.

Another object of this invention is to provide a distent indicating mechanism which may be cheaply constructed and operated at a minimum cost.

A further object is to provide an indication that will be particularly useful to the proprietors of cafés, restaurants, etc., for ascertaining about the amount registered when in different parts of the room or in a private office.

With these and incidental objects in view, the invention consists in certain novel features of construction and combination of parts, the essential elements of which are set forth in appended claims and a preferred form of embodiment of which is hereinafter specifically described with reference to the drawings which accompany and form part of this specification.

Figure 1:
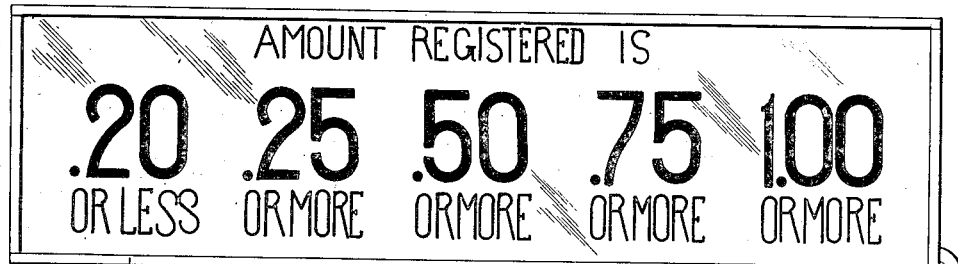
Figure 1:
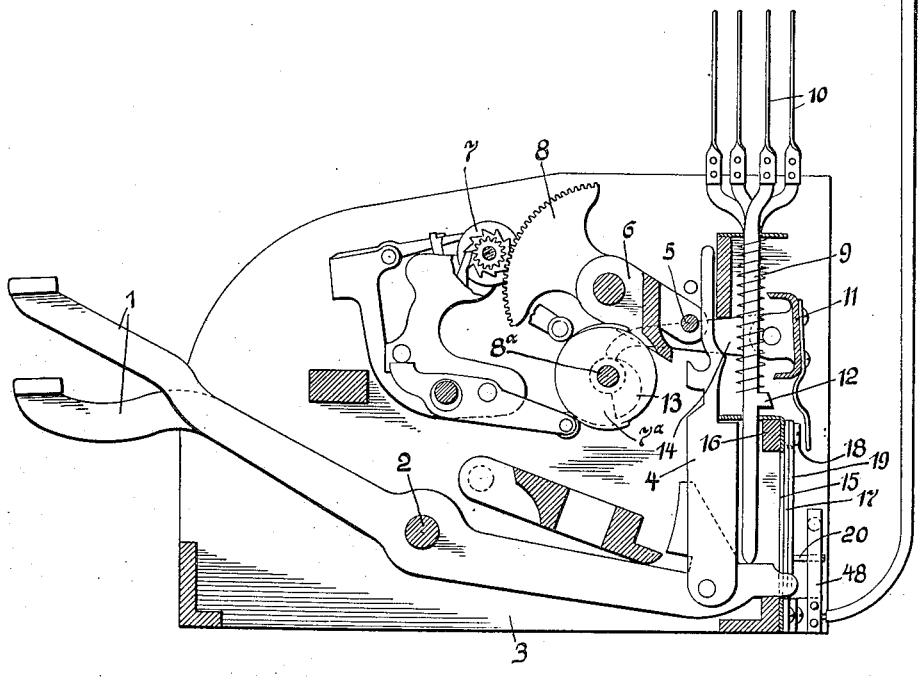
Figure 2:
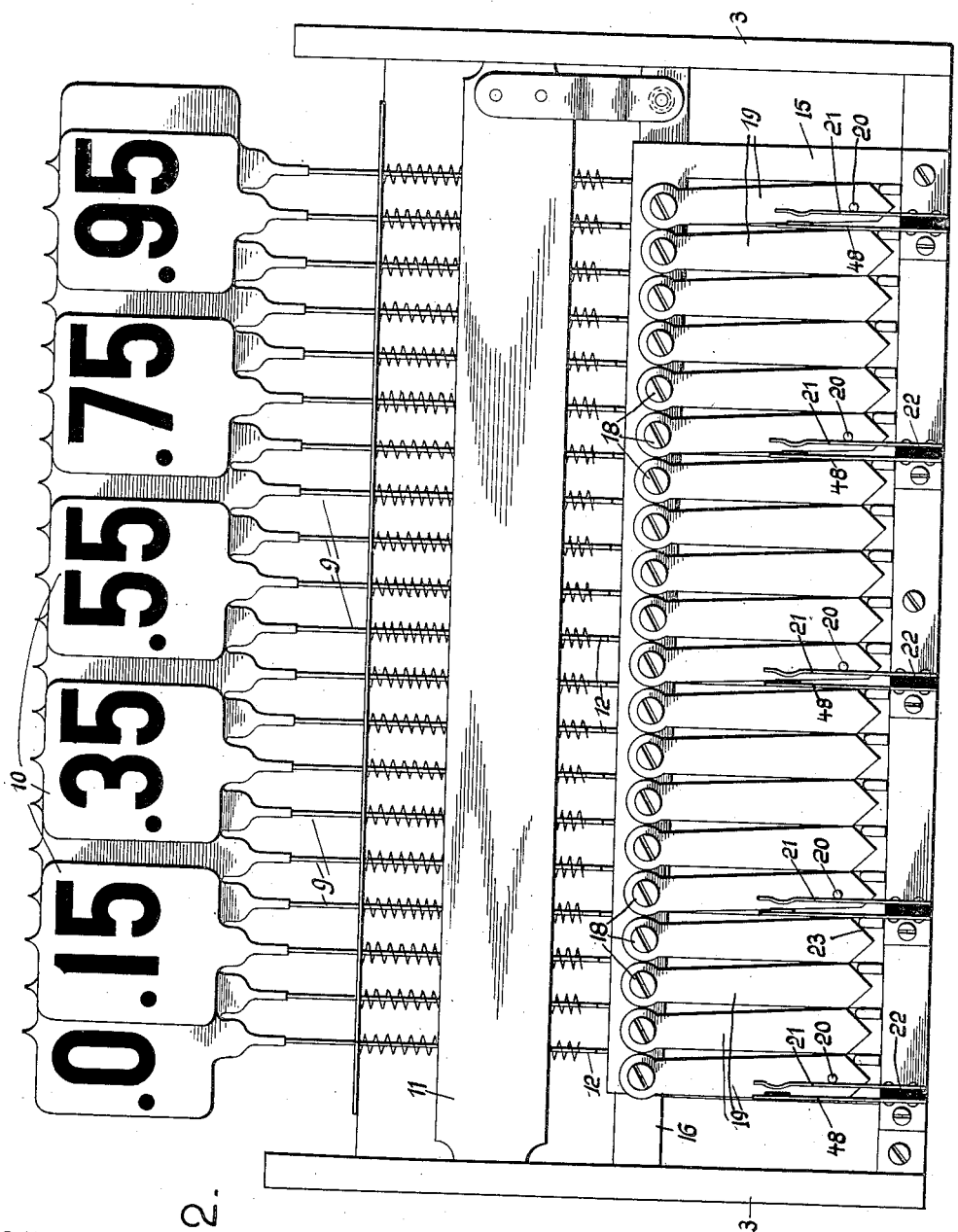

Of said drawings: Figure 1 represents a central transverse section of the type of machine such as shown and described in the patent granted to Thomas Carney, May 23, 1893, No. 497,860, with the improved distant indicating mechanism connected thereto; Fig. 2 represents a rear elevation of the machine shown in Fig. 1; Fig. 3 represents a vertical longitudinal section of the distant indicating mechanism with the wiring therefor shown in diagram; and Fig. 4 represents a central transverse section through one of the compartments of the distant indicating mechanism.

Described in general terms, the machine comprises a series of operating keys, which are arranged to register and indicate at the machine the amount represented by the key or keys depressed and to control mechanism for indicating the amount at a distance. These keys are arranged in groups and each group is wired to a separate compartment of the distant indicating mechanism; each compartment being provided with a constantly burning light which is arranged to indicate by numerals painted upon the glass in front and rear of said compartment, when obstructing devices or shutters controlled by the keys of the corresponding compartment, are withdrawn.

*Operating devices.*—The operating keys 1 are mounted upon a transverse shaft 2 which is suitably secured in the side frames 3 of the machine. The rear end of each amount key is provided with a cam 4 that engages with a transverse rod 5 when the key is operated and rocks a registering frame 6 to register the amount represented by the key upon a counter 7 through means of a segment 8 carried by the said frame 6, the counter 7 being rocked into and out of engagement with the segment 8 by cams $7^a$ secured to a rotary shaft $8^a$. The rear ends of the key levers 1 support indicator rods 9 which carry at their upper ends indicators 10, the latter being brought into view by the operation of the keys and are held there by a transverse frame 11 which engages under lugs 12 carried by the indicator rods 9. The frame 11 is rocked by a cam 13 secured to the rotary shaft $8^a$, which engages with a forwardly extending arm 14 of said frame, all of which is fully shown and described in the aforesaid patent.

*Distant indicating mechanism.*—A guide 15 for the rear ends of the keys 1 is suitably secured to cross bar 16 connecting the side frames of the machine. Pivoted to one side of the cross rod 16 are key stops or arresters 17, which, as well known in the art, prevent simultaneous operation of two or more keys. Hangers 19 are located in the rear of the stops 17 and are supported by the same screws 18 that support the key stops 17. These latter hangers, are arranged in groups (see Fig. 2) and the first hanger of each group is provided with a rearwardly extending pin 20, which contacts with a leaf spring 21 forming one member of a switch 22. These leaf springs 21 force the hangers 19 toward the right with their lower beveled ends 23 in contact with the rear ends of the key levers 1.

It will be seen by reference to Fig. 2, that the left hand side of the first hanger of each group, except the first group, is slightly cut away, so that when it is swung toward the left by the operation of one of the keys in its group, it will not operate the hangers of the groups to the left of same.

The distant indicating mechanism comprises a rectangular box 24 divided into a plurality of compartments 25, each of which is provided with a constantly burning electric lamp 26. These lamps are shown as wired in multiple as usual and are lighted by the battery 27 or by any suitable connection with a lighting circuit. The box or casing 24 is provided at its front and rear with openings which are covered by frosted glasses 28 that have painted or placed thereon in any suitable manner numerals representing the different groups of key levers 1 and hangers 19 and suitable explanatory wording which, as shown in Fig. 1, comprises the following: .20 or less, .25 or more, .50 or more, .75 or more and 1.00 or more.

Plates or screens 29, pivoted upon rigid transverse rods 30, are located immediately behind the glasses 28 of the front and rear sides of each compartment 25 to prevent the lamp 26 from illuminating the glasses in each compartment. Rigid arms 31 of the plates 29 of each compartment are connected by links 32 to the outer ends of an arm 33 rigidly connected at its center to an armature 34 of a solenoid 35. The plates 29 of each compartment are normally held in the positions shown in Fig. 4 by a coil spring 36, the ends of which are connected to a pin 37 projecting from the core 34 and a hook 38 extending downwardly from a partition 39 above said plates and which extends from one end to the other of the box 24. The upward movement of each armature 34 is limited by a beveled lug 40 which contacts with the lower side of the partition 39. When any one of the solenoids 35 is energized as hereinafter described, its armature 34 will be drawn downward and the plates 29 rocked inward so that the lamp 26 may illuminate the glasses of the compartments corresponding to the solenoid energized. It will be noticed that the right hand arm 31, shown in Fig. 4, is shorter than that shown on the left by which means the plate 29 connected thereto will be moved inwardly faster than the plate connected to the other arm 31, so as not to interfere with each other in their inward movements. In the downward movement of the core 34, lug 40 will engage with a latch plate 41 secured to a transverse shaft 42, and rock said shaft against the tension of a spring 43 secured at one end to an arm 44 projecting upwardly from the shaft, and its other end to a pin 45 projecting from the upper side of the partition 39. As the plate 41 is rocked rearwardly by the lug 40, the shaft 42 will also rock the remaining plates 41, of which there is one for each armature 34, so as to release any previously operated core that is held in its lower position by its plate 41.

Upon the glass on each side of the casing 24 and above the partition 39 is painted the words "Amount registered is". These glasses are illuminated by constantly burning lamps 46 also connected in multiple to battery 27. Partitions 47 extend across the machine in rear of the lamps 46 to prevent the shadow of the upper ends of the cores 34 from being cast upon the glasses 28. It will be understood that the wording "Amount registered is" is always illuminated, while the amounts and the wording beneath them are not illuminated until the plates 29 are moved to horizontal positions.

The machine, as shown in Fig. 2, comprises 20 keys which are arranged to register from 5¢ to $1.00. The first four of these keys, which register from 5 to 20 cents inclusive, operate the first group of hangers 19; the next five, which register from 25 to 45 cents, operate the second group of hangers; the next five keys, which register from 50 to 70 cents, operate the third group of hangers, and the next five keys, which register from 75 to 95 cents, operate the fourth group of hangers, while the last key, which registers $1.00, operates the hanger on the extreme right hand end, it being understood that when any key of any group is operated, the left hand hanger of said group will force the leaf spring 21 into contact with the other member 48 of its switch 22 and thereby close a circuit through the batteries 49 to its corresponding solenoid 35, which will attract its armature 34 and rock the plates 29 rearwardly by the previously described intervening mechanism, so that the lamp 26 may illuminate the indicators corresponding to the group in which the key is actuated.

The mechanism above described is particularly designed for use in a café, restaurant, etc., in which the head waiter, proprietor, floor walker or other trusted employee is constantly on the alert to ascertain if the proper amounts are being registered. The illuminated indicating device may be located immediately above the register, so as to be visible the entire length of the establishment, or it may be located at some distant point, such as the proprietor's private office. If the mechanism is used in a restaurant, for instance, the proprietor would see certain customers being served with certain kinds of food, and he would know that certain amounts should be registered for this food. He, however, does not wish to go to the cash register each time to see that these amounts are registered, as he does not care to have his cashiers or waiters think that he suspects them of any false registrations. With the illuminated indicator, however, he will see at once that certain amounts or over have been registered. While this indicator does not give the exact amount registered, at the same time, it gives the proprietor the information that the operator has not registered a very small amount, or pretended to register by opening the cash drawer by the "No sale" key.

The usual protection is derived from the regular indicators 10, which are visible to the customers standing or sitting in the establishment. It will, of course, be understood that if so desired, two of the numerals on the indicator 24 may be illuminated at the same time by properly arranging the contacts 21 and 48 and the pins 20. In other words, if a sale,—say of 70¢ had been made, a 20¢ and 50¢ indicator could be illuminated. Any other desired combinations might be made to secure the exact indication of the amount registered, while providing a very small number only of independent indicating numerals for the corresponding small number of circuits. The present invention is intended to obviate the necessity of bringing a current of heavy voltage into the cash register and to operate the indicator as far as connection with the register is concerned by a very low voltage current supplied if desired by ordinary dry batteries and which does not require the sanction of fire insurance underwriters. This operation of the illuminated indicator by ordinary dry cells, also greatly reduces the cost of a device of this nature. Further, the construction is such that this improved indicator may be readily applied to registers now in use, no changes in the cabinet, frame or other parts being necessary.

While the form of mechanism herein shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is as follows:

1. In a cash register, the combination with a series of keys divided into groups, of a plurality of indicators one for each group of keys, constantly burning lights for said indicators, guards for preventing the lights from illuminating the indicators, and means controlled by each group of keys for controlling the guards.

2. In a cash register, the combination with a series of keys divided into groups, of a plurality of indicators one for each group, lights for said indicators, guards interposed between the lights and indicators to prevent the illumination of the indicators, and means controlled by each group of keys for withdrawing the guard from its particular indicator.

3. In a cash register, the combination with an operating mechanism, of an indicator, a light, a guard interposed between the light and indicator to prevent the illumination of the indicator, means controlled by the operating mechanism for withdrawing the guard, and means for holding the latter in its withdrawn position.

4. In a cash register, the combination with a series of keys divided into groups, of a plurality of indicators one for each group, lights for said indicators, guards interposed between the lights and indicators to prevent the illumination of the indicators, means controlled by each group of keys for withdrawing the guard from its particular indicator, and means for holding the guard in its withdrawn position.

5. In a cash register, the combination with a series of keys divided into groups, of a plurality of indicators one for each group, constantly burning lights for said indicators, pivoted plates interposed between the lights and indicators to prevent the illumination of the latter, means controlled by each group of keys for withdrawing a plate from its particular indicator and means for holding the plate in its withdrawn position.

6. In a cash register, the combination with an operating mechanism, of duplicate indicators, a constantly burning light for said indicators, pivoted plates interposed between the light and indicators to prevent the illumination of the latter and means controlled by the operating mechanism for rocking said plates so that one may pass the other to allow the light to illuminate the indicators.

7. In a cash register, the combination with a series of keys divided into groups, of a plurality of indicators arranged in pairs one for each group, constantly burning lights for said indicators, pivoted plates interposed between the lights and indicators to prevent the illumination of the latter, and means controlled by each group of keys for rocking the plates controlled thereby toward each other, so that one may pass the other, to allow the light to illuminate the indicators.

8. In a cash register, the combination with a series of keys, of a plurality of indicators, constantly burning lights for illuminating the latter, pivoted plates for preventing the illumination of the indicators by the lights, magnets for rocking said plates to allow the illumination of the indicators, and means controlled by the keys for energizing the magnets.

9. In a cash register, the combination with a key, of a distant indicator therefor, a light for illuminating the latter, a guard for preventing the illumination of the indicator, a magnetic device for controlling the guard to allow the illumination of the indicator, a source of electrical energy for the magnetic device controlled by the key, and means for holding the plate in a withdrawn position.

10. In a cash register, the combination with a group of keys, a plurality of key arresters operated by the keys, an electrically operated indicator, an electrical circuit for the indicator, and means operated by the key arresters for closing said circuit whereby the depression of any key will operate the indicator.

11. In a cash register, the combination with a plurality of groups of keys, of a plurality of electrically operated indicators, electrical circuits for the indicators, key arresters operated by the keys for each group of keys, and means controlled by each group of key arresters for closing one of said circuits.

In testimony whereof I affix my signature in the presence of two witnesses.

WILLIAM H. MUZZY.

Witnesses:
  R. W. FAIRCHILD,
  AL. HERBIG.